(No Model.)

G. D. HOUSTON.
CORN CULTIVATOR.

No. 510,916.

Patented Dec. 19, 1893.

2 Sheets—Sheet 1.

Witnesses:
Jas. K. McCathran
W. S. Duvall

By his Attorneys,
C. A. Snow & Co.

George D. Houston
Inventor (No Model.) 2 Sheets—Sheet 2.
G. D. HOUSTON.
CORN CULTIVATOR.
No. 510,916. Patented Dec. 19, 1893.
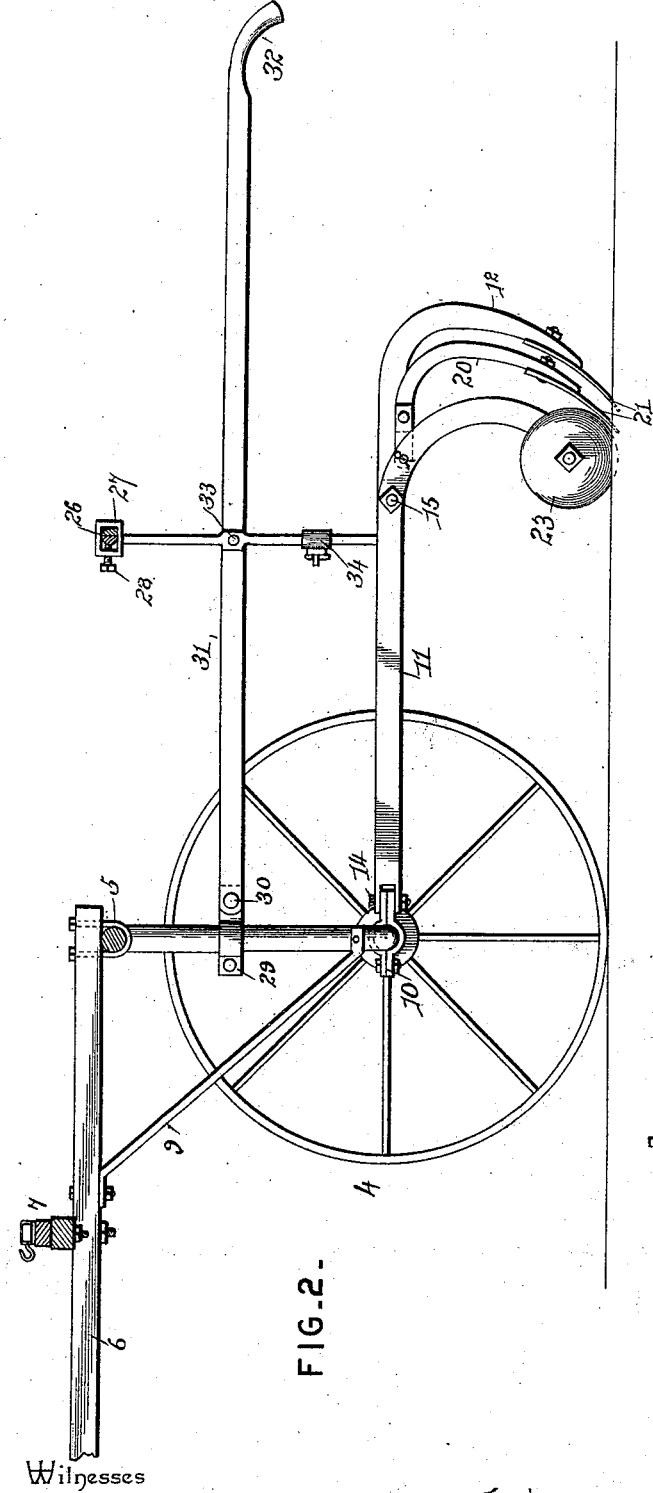
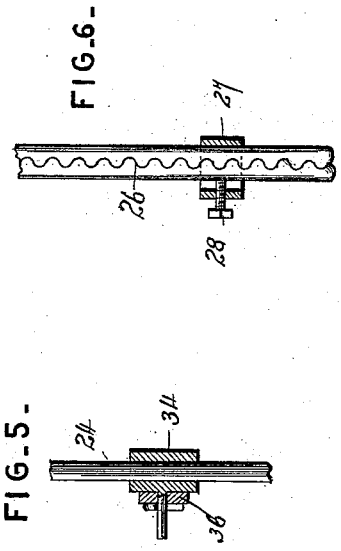
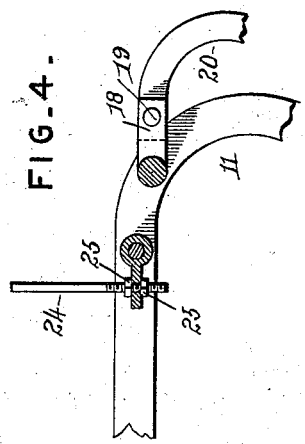
Witnesses
Jas. K. McCathran
W. T. Duvall
Inventor
George D. Houston
By his Attorneys.
C. A. Snow & Co.

UNITED STATES PATENT OFFICE.

GEORGE D. HOUSTON, OF RUSHVILLE, ILLINOIS.

CORN-CULTIVATOR.

SPECIFICATION forming part of Letters Patent No. 510,916, dated December 19, 1893.

Application filed June 26, 1893. Serial No. 478,868. (No model.)

*To all whom it may concern:*

Be it known that I, GEORGE D. HOUSTON, a citizen of the United States, residing at Rushville, in the county of Schuyler and State of Illinois, have invented a new and useful Corn-Cultivator, of which the following is a specification.

My invention relates to improvements in cultivators, and particularly to that class employed for cultivating corn.

The objects of my invention are to provide a machine that is simple, cheap and durable, the same being so constructed as to simultaneously cultivate the opposite sides of two rows, to be especially designed for the cultivation of young corn, which operation is performed without injury thereto and in an efficient manner; which may be readily changed so as to be adapted for the cultivation of older corn; to provide for a flexible connection between the gangs or sets of cultivators, whereby the same may be readily moved in a lateral direction so as to conform to the rows of corn; to provide for an adjustment of the cultivators of each gang with relation to each other; for an adjustment of the gangs; and finally for a raising and lowering of either one of the gangs independent of the other.

With these and other objects in view the invention consists in certain features of construction hereinafter specified and particularly pointed out in the claims.

Figure 1:
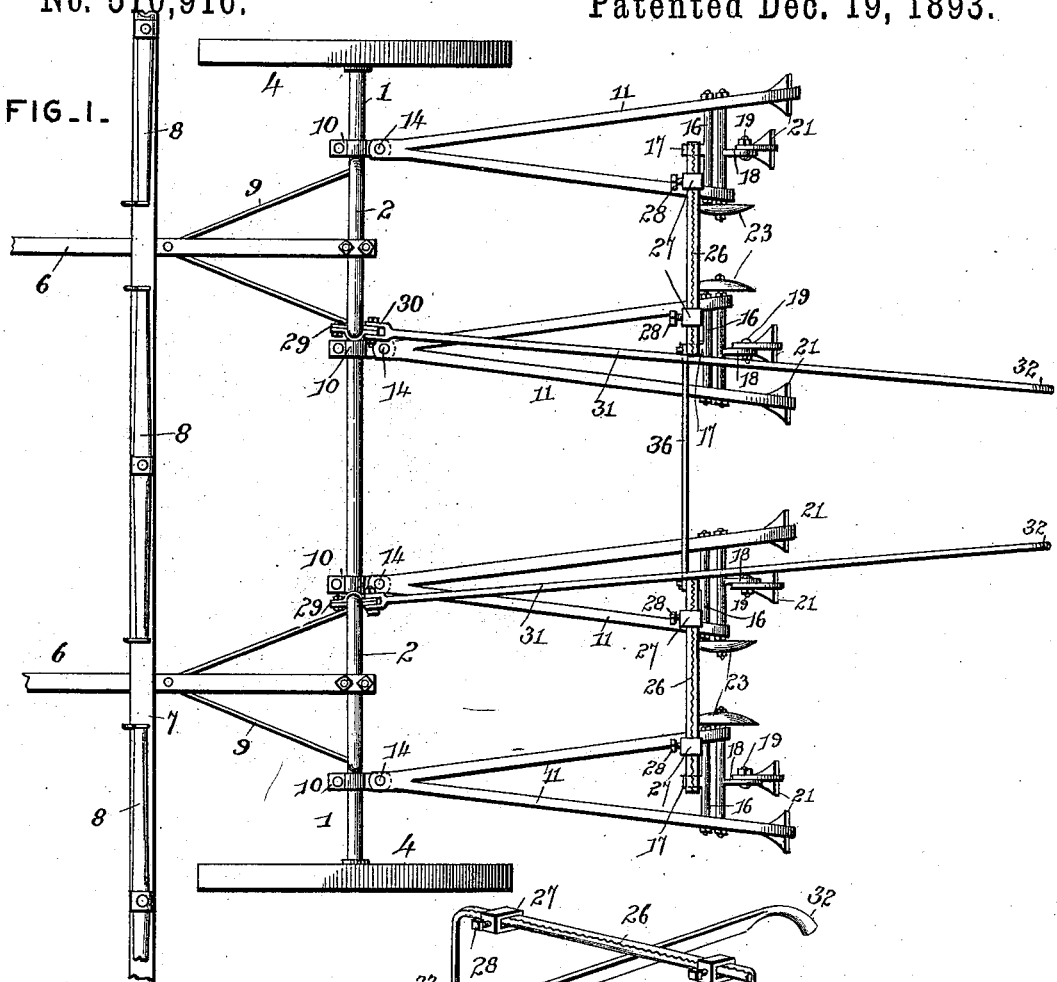
Figure 3:
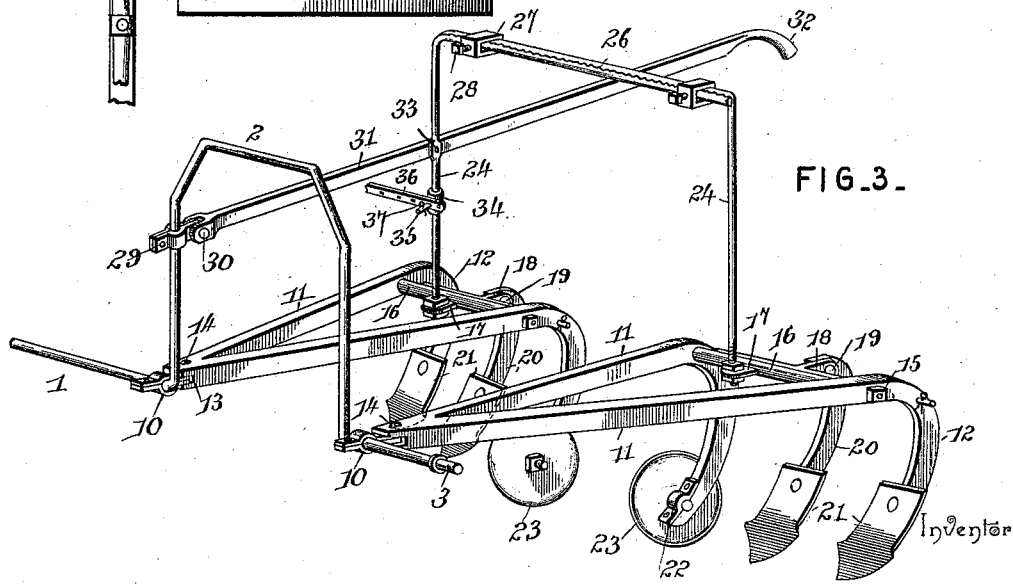

Referring to the drawings:—Figure 1 is a plan view of a cultivator constructed in accordance with my invention. Fig. 2 is a vertical longitudinal sectional view of the same. Fig. 3 is a perspective in detail of one of the gangs or sections. Fig. 4 is a longitudinal sectional view through one of the gangs. Fig. 5 is a vertical longitudinal sectional view through the connection between the gangs. Fig. 6 is a top plan view of a portion of the adjusting standards, the securing sleeves being shown in horizontal section.

Like numerals of reference indicate like parts in all the figures of the drawings.

In practicing my invention I employ a front transverse axle 1, which near its ends and at each side of its center is provided with arched portions 2, the extremities of the axle terminating in spindles 3 for the accommodation of ground wheels 4.

To each of the arched portions 2 there is clipped as at 5 a draft pole 6, the said poles being connected by a transverse bar 7 upon which there is mounted a series of singletrees 8. Securely bolted to the under side of each of the draft poles 6 is a pair of diverging braces 9, whose rear ends are secured to the axle 1 at opposite sides of the arches 2.

Upon the axle at each side of the two arches there is secured a split-clip 10, and bifurcated to receive the rear end of each clip is a pair of twin diverging beams 11, the outer beam of each pair extending in rear of the companion beam and each terminating in a downwardly disposed or curved goose-neck standard 12. The front end of the diverging beams is transverse slotted or bifurcated as at 13 so as to embrace the rear end of its clip 10, and a pivot-bolt 14 serves to secure each pair of beams to its respective clip. The beams of each pair are connected by a transverse tie-bolt 15, which between the beams has a spacing sleeve 16 mounted thereon. This spacing sleeve has formed at its front side a perforated lug 17 and at its rear side a vertically disposed perforated lug 18. Pivoted to each lug 18 by a bolt 19 is a depending standard 20. The outer standards 12 and the standards 20 of each pair of beams are provided with shovels 21 and so also may the inner standards of each pair of beams be thus provided and they are so provided when employed in cultivating standing corn. In the present instance, however, I have shown the machine as adapted for the cultivation of young corn and I therefore secure in bearings 22 with which said inner standards 12 are provided with concavo-convexed cultivating disks 23 which have their convexed sides innermost.

Loosely swiveled in each of the horizontal perforated lugs 17 is an inverted L-shaped standard 24, the lower ends of said standards being provided with threads and having applied thereto above and below the lugs 17 nuts 25, as best shown in Fig. 4. The upper or horizontal portions of the standards 17 overlap at a point above and intermediate the same, and at their adjacent faces are provided with interlocking serrations or teeth 26. These horizontal portions are loosely passed through a pair of collars 27 each collar carrying a binding screw 28 which is designed to bind upon the said horizontal branches of the standards 24 so that as will be obvious by moving the pairs of beams to and from each other subsequent to a loosening of the binding-screw 28 the same will be adjusted relatively and may be secured at any point of adjustment simply by a retightening of the said screws. A split clip 29 is mounted upon the inner terminal of each of the arches 2 and bifurcated to receive and pivoted to each of said clips as at 30 is a lever 31 which terminates beyond the arch formed by the L-shaped standards in handles 32. At the points of intersections between the handles 31 and the inner inverted L-shaped standards 24 the said handles are pivoted thereto by bolts 33.

Secured to the inner inverted L-shaped standards 24 are sleeves 34 from which project perforated studs 35. These studs are connected by means of a transverse connecting bar 36, which, as best shown in Fig. 3, is provided near its ends with perforations, any pair of which may receive the studs. By arranging the different perforations over the studs it will be seen that the gangs composing each two pairs of twin beams may be adjusted with relation to each other and in accordance with the width apart of the rows. Split pins 37 may be passed through the studs for the purpose of retaining the bar 36 in position thereon.

It will be seen that the construction of my machine is very simple and that I may employ either a series of shovels as when cultivating older or standing corn, or as shown in the drawings, I may employ a combination of shovels and disks, the latter being located at the inner sides of each series of standards and having their convexed sides toward the young corn, which has a tendency to direct the soil therefrom instead of hilling-up as the ordinary shovels do.

It will be obvious that the operator following after the machine may swing the beams laterally so as to follow the course of a row, such movement being permissible by reason of the point of pivot 14 at the front ends of the beams. By grasping one of the handles 32 and employing the pivot bolt 30 as a fulcrum, the gangs are capable of being elevated, each independent of the other, and with very little exertion, this being permissible by reason of the split clips 10 loosely mounted on the axle 1 and the loose connection between the rod 36 and the inner L-shaped standards 24.

If at any time it is desired to operate closer to the row of corn the bolts 28 are loosened so as to permit of the drawing together of the toothed horizontal portions 26 of the inverted L-shaped standards 24. After such adjustment has been secured the binding bolts 28 are retightened. Adjustments between the gangs may be secured by entering the different holes of the bar 36 over the studs 35. By reason of the swiveling of the inverted L-shaped standards 24 that connect the inner standards of the two gangs it will be seen that the lateral movements of the gangs are permissible and that no binding whatever takes place.

I do not limit my invention to the various details of construction herein shown and described, but hold that I may vary the same to any degree and extent within the knowledge of the skilled mechanic.

Having described my invention, what I claim is—

1. In a cultivator, the combination with an axle having an arch, and a pair of ground-wheels, of a pair of diverging cultivator-beams at opposite sides of the arch and pivoted for horizontal movement thereto, cultivating-devices at the ends of the beams, tie-rods connecting the beams of each pair, sleeves arranged on the rods and provided with intermediate perforated lugs, inverted L-shaped standards swiveled in the lugs, threaded, and provided with nuts, and having their upper ends overlapped, and devices for connecting the overlapped ends of each pair, substantially as specified.

2. In a cultivator, the combination with an arched axle, and ground wheels, of opposite pairs of diverging cultivator beams connected for vertical and horizontal movement to the axle at opposite sides of the arch and terminating in cultivator shovels, inverted L-shaped standards pivotally connected to the beams and having their upper ends overlapped, means for securing the overlapped ends adjustably together, and a handle fulcrumed at the inner sides of the standards and pivotally connected at their front ends to the arches substantially as specified.

3. In a cultivator, the combination with an axle having an arch, and opposite ground wheels, of opposite pairs of cultivator beams loosely connected at their front ends to the axle, tie-rods connecting each pair of beams, sleeves supported on the tie-rods and having forwardly disposed perforated lugs, inverted L-shaped standards swiveled in the lugs and having their upper ends overlapped, and adjusting devices for the same, substantially as specified.

4. In a cultivator, the combination with the axle having the opposite arches 2, and the ground-wheels, the opposite pairs of diverging beams at opposite sides of the arches, the outer beams of each pair terminating at their rear ends in shovels, and the inner beams carrying disks, a depending central shovel carrying standard between each pair of beams, and means for connecting the beams in gangs and the gangs to each other, substantially as specified.

5. In a cultivator, the combination with an arched axle and the ground wheels, of the opposite pairs of diverging beams terminating at their rear ends in standards, shovels on the outer beams of the pairs, and harrow disks on the inner beams, substantially as specified.

6. In a cultivator, the combination with the axle having the opposite arches 2, and the ground wheels, the opposite pairs of diverging beams at opposite sides of the arches and terminating at their rear ends in shovels, the swiveled pairs of L-shaped standards connected with the pair of beams and adjustably connected with each other forming opposite gangs, sleeves mounted on the inner standards and provided with perforated studs, a perforated adjusting bar engaging the studs, and split pins passing through the studs, substantially as specified.

In testimony that I claim the foregoing as my own I have hereto affixed my signature in the presence of two witnesses.

GEORGE D. HOUSTON.

Witnesses:
E. G. SIGGERS,
J. H. SIGGERS.